(12) United States Patent
Huang et al.

(10) Patent No.: US 8,149,603 B2
(45) Date of Patent: Apr. 3, 2012

(54) RESONANCE CIRCUIT FOR DC-LINK VOLTAGE CONTROL IN DC-TO-AC INVERTER

(75) Inventors: Yung-Fu Huang, Miaoli County (TW); Yoshihiro Konishi, Hsinchu (TW); Min-Ju Hsieh, Kaohsiung (TW)

(73) Assignee: Industrial Technology Research Institute, Hsinchu (TW)

( * ) Notice: Subject to any disclaimer, the term of this patent is extended or adjusted under 35 U.S.C. 154(b) by 194 days.

(21) Appl. No.: 12/779,190

(22) Filed: May 13, 2010

(65) Prior Publication Data
US 2011/0103107 A1 May 5, 2011

(30) Foreign Application Priority Data

Nov. 3, 2009 (TW) ................................. 98137259 A

(51) Int. Cl.
*G05F 1/33* (2006.01)
*G05F 3/06* (2006.01)
(52) U.S. Cl. ...................................... 363/97; 363/21.03
(58) Field of Classification Search .................. 363/109, 363/131, 135–136, 21.01–21.03, 21.1, 21.12–21.14, 363/21.18, 27, 28, 97
See application file for complete search history.

(56) References Cited

U.S. PATENT DOCUMENTS

| | | | |
|---|---|---|---|
| 5,172,309 A | 12/1992 | DeDoncker et al. | |
| 5,841,644 A | 11/1998 | Lipo et al. | |
| 5,883,795 A * | 3/1999 | Farrington | ................. 363/21.04 |
| 6,111,770 A | 8/2000 | Peng | |
| 6,473,318 B1 * | 10/2002 | Qian et al. | ................. 363/21.16 |
| 7,142,439 B2 | 11/2006 | Oh | |
| 7,630,219 B2 * | 12/2009 | Lee | ............................. 363/21.16 |
| 2005/0073861 A1 * | 4/2005 | Ke et al. | ........................ 363/20 |

* cited by examiner

*Primary Examiner* — Gary L Laxton
*Assistant Examiner* — Henry Lee, III
(74) *Attorney, Agent, or Firm* — WPAT., P.C.; Justin King

(57) ABSTRACT

The present disclosure relates to a resonance circuit for DC-link voltage control in a DC-to-AC inverter. The resonance circuit comprises two active switches. Before the active switches of the DC-to-AC inverter are turned on, a DC-link voltage is isolated by the active switches and the active switches of the DC-to-AC inverter are discharged by the resonance circuit to zero voltage at both ends. Then, the active switches of the DC-to-AC inverter are turned on again after the DC-link voltage is charged by the resonance circuit until the DC-link voltage restores to a normal voltage value. Hence, the active switches of the DC-to-AC inverter achieve zero-voltage switching. Not only the switching loss can be reduced to enhance the conversion efficiency, but also the electro-magnetic interference as well as the RF interference due to dynamic transient changes of the voltage (dv/dt) and of the current (di/dt) can be lowered.

5 Claims, 6 Drawing Sheets

RESONANCE CIRCUIT FOR DC-LINK VOLTAGE CONTROL IN DC-TO-AC INVERTER

TECHNICAL FIELD

The disclosure generally relates to a resonance circuit for DC-link voltage control in a DC-to-AC inverter and, more particularly, to a resonance circuit with soft switching to reduce surge voltage by returning a certain amount of energy to the electricity system to reduce switching loss and enhance conversion efficiency of the DC-to-AC inverter.

TECHNICAL BACKGROUND

With the rapid development in renewable energies as a trend in recent years, the interface between the renewable energies and AC utility has attracted tremendous attention. Distributed power systems having DC-to-AC inverters use active switches such as IGBT's, ESBT's, SiC-SBD's, SiC-JFET's and SiC-SIT's to achieve miniaturization and high conversion efficiency by high-frequency switching. However, parasitic inductance and parasitic capacitance may occur at high frequencies to result in significant electro-magnetic interference and RF interference that may adversely affect the performances of electronic products or even cause damages to electronic products.

The high-frequency pulse-width modulation (PWM) power conversion system using soft switching exhibits lowered switching loss, reduced electro-magnetic interference and RF interference and higher power densities.

DC-to-AC inverters are mostly used in distributed power systems or renewable energy systems to convert DC power to AC power. The active switches with hard switching in the inverter often result in switching loss, such as turn-on loss or turn-off loss. Moreover, with hard switching, surge voltage often occurs to damage the switches. If the switching loss can be lowered, the conversion efficiency of the DC-to-AC inverter can be enhanced and so is the lifetime of the switches. As the switching frequency increases, parasitic inductance and parasitic capacitance may occur to result in significant electro-magnetic interference and RF interference. On the contrary, soft switching may help to achieve zero-voltage or zero-current switching to solve problems due to electro-magnetic interference and RF interference.

The conventional DC-to-AC inverter uses hard switching to cause significant electro-magnetic interference and RF interference due to parasitic inductance and parasitic capacitance. Therefore, there is need in providing a resonance circuit using zero-voltage switching to reduce switching loss, enhance conversion efficiency and eliminate electro-magnetic interference as well as the RF interference due to dynamic transient changes of the voltage (dv/dt) and of the current (di/dt).

SUMMARY

In view of the above, this disclosure provides a resonance circuit for DC-link voltage control in a DC-to-AC inverter using soft switching to reduce surge voltage by returning a certain amount of energy to the electricity system to reduce switching loss and enhance conversion efficiency of the DC-to-AC inverter.

This disclosure further provides a resonance circuit for DC-link voltage control in a DC-to-AC inverter using soft switching to reduce switching loss by discharging the switches to zero voltage before the switches are turned on to achieve zero-voltage switching so as to reduce switching loss and enhance conversion efficiency of the DC-to-AC inverter.

In one embodiment, this disclosure provides a resonance circuit for DC-link voltage control in a DC-to-AC inverter, comprising:
  two active switches;
  a coupled inductor comprising two windings;
  an inductor;
  five passive switches; and
  three capacitors;
  wherein,
    a first active switch of the two active switches has a positive terminal connected in series with a positive terminal of a first capacitor of the three capacitors and a negative terminal connected in parallel with a negative terminal of a first passive switch of the five passive switches,
    a positive terminal of the first passive switch is connected with a negative terminal of a second passive switch of the five passive switches and one terminal of the second capacitor,
    a positive terminal of the second passive switch is connected with one terminal of the inductor, while the other terminal of the inductor is connected in parallel with a negative terminal of the first capacitor,
    a positive terminal of a third passive switch of the five passive switches is connected with the positive terminal of the first passive switch, the negative terminal of the second passive switch and one terminal of the second capacitor, while a negative terminal of the third passive switch is connected in parallel with the other terminal of the second capacitor, a negative terminal of a primary side of the coupled inductor and one terminal of a second active switch of the two active switches,
    the other terminal of the second active switch is connected with a negative terminal of the first capacitor,
    the negative terminal of the first active switch is connected with a positive terminal of the primary side and a negative terminal of a secondary side of the coupled inductor,
    a positive terminal of a fourth passive switch of the five passive switches is connected with the negative terminal of the first capacitor after a positive terminal of the secondary side of the coupled inductor is connected with a negative terminal of a fourth passive switch of the five passive switches,
    a positive terminal of a fifth passive switch of the passive switches is connected with the negative terminal of the first capacitor after a third capacitor of the three capacitors is connected in parallel with the fifth passive switch, and
    a negative terminal of the fifth passive switch is connected with the negative terminal of the first active switch.

In one embodiment, this disclosure provides a method for DC-link voltage control in a DC-to-AC inverter using a resonance circuit, comprising steps of:
  discharging the second capacitor to zero voltage by the second active switch when the first active switch is turned off and the second active switch is turned on so that a current from the inductor flows through the second passive switch to cause the inductor to resonate with the second capacitor;
  discharging the third capacitor to zero voltage by the second active switch when the third capacitor resonates with the coupled inductor;
  continuing discharging the third capacitor by the second active switch after the second capacitor is discharged to zero voltage by the second active switch so that the current from the inductor flows through the third passive switch and the second active switch to cause the third capacitor to resonate with the coupled inductor;

conducting the current from the coupled inductor to flow through the fifth passive switch and the second active switch after the third capacitor is discharged to zero voltage by the second active switch;

charging the third capacitor by conducting the current from the coupled inductor to flow through the fourth passive switch and the winding on the secondary side, and charging the second capacitor by conducting a current from the primary side of the coupled inductor when the second active switch is turned off; and charging the first capacitor by turning on the first active switch to conduct the current from the inductor and the current from the coupled inductor when the second capacitor and the third capacitor are charged to predetermined voltage values.

BRIEF DESCRIPTION OF THE DRAWINGS

The embodiment of the disclosure will be readily understood by the accompanying drawings and detailed descriptions, wherein.

DETAILED DESCRIPTION OF THIS DISCLOSURE

The disclosure can be exemplified by but not limited to the embodiment as described hereinafter.

Figure 1:
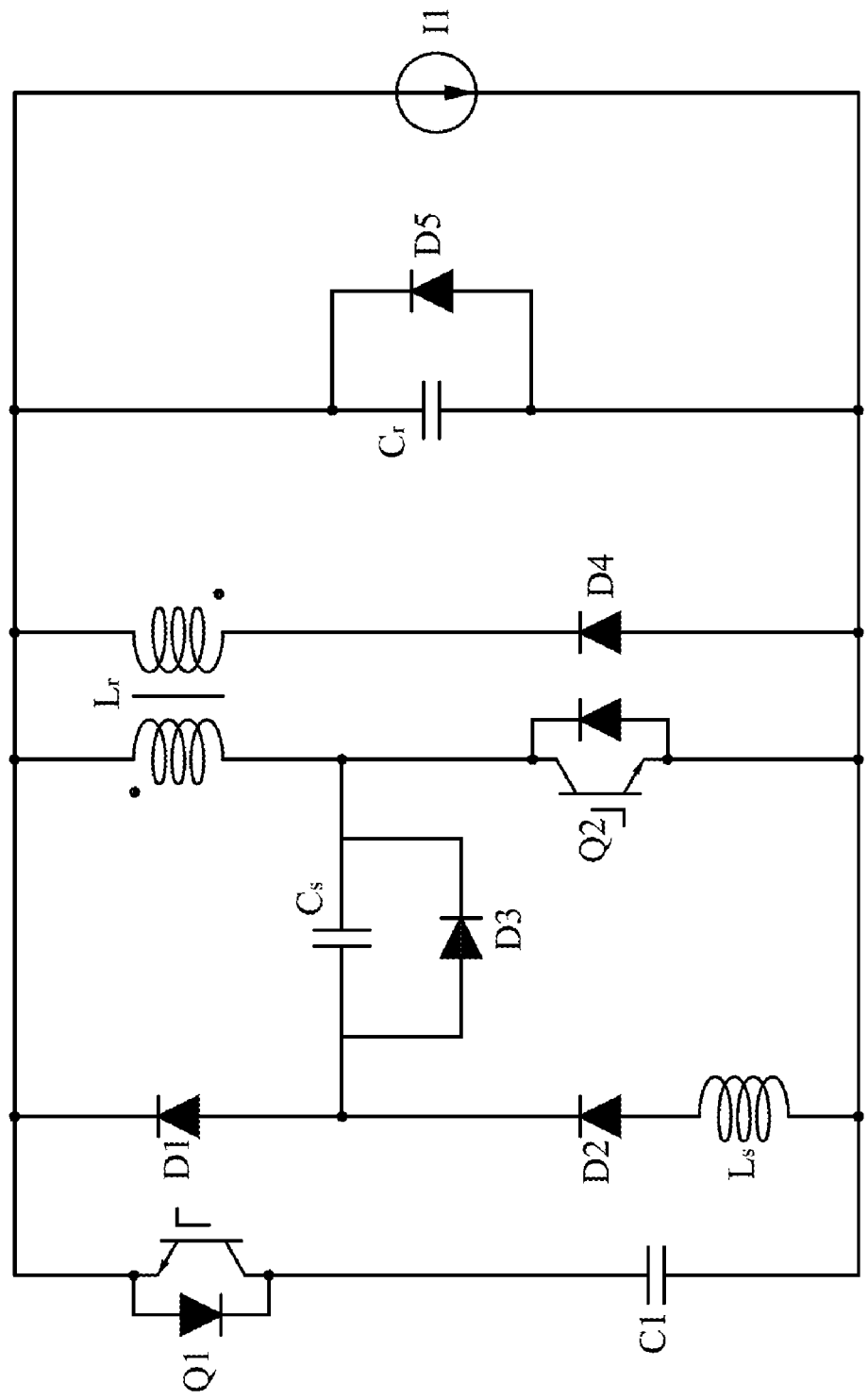
FIG. 1 is a circuit diagram of a resonance circuit for DC-link voltage control in a DC-to-AC inverter of this disclosure.

Please refer to FIG. 1, which is a circuit diagram of a resonance circuit for DC-link voltage control in a DC-to-AC inverter of this disclosure. The resonance circuit comprises two inductors (Ls, Lr), five passive switches (D1, D2, D3, D4, D5); and three capacitors (C1, Cs, Cr); and two active switches (Q1, Q2). The coupled inductor Lr comprises a primary side winding and a secondary side winding. The active switches (Q1, Q2) are implemented using bipolar transistors. The resonance circuit further comprises a diode between a source electrode and a drain electrode of each of the two active switches (Q1, Q2). The passive switches (D1, D2, D3, D4, D5) are implemented using diodes.

More particularly, a first active switch Q1 has a positive terminal connected in series with a positive terminal of a first capacitor C1 and a negative terminal connected in parallel with a negative terminal of a first passive switch D1. A positive terminal of the first passive switch D1 is connected with a negative terminal of a second passive switch D2 and one terminal of the second capacitor Cs. A positive terminal of the second passive switch D2 is connected with one terminal of the inductor Ls, while the other terminal of the inductor Ls is connected in parallel with a negative terminal of the first capacitor C1. A positive terminal of a third passive switch D3 is connected with the positive terminal of the first passive switch D1, the negative terminal of the second passive switch D2 and one terminal of the second capacitor Cs, while a negative terminal of the third passive switch D3 is connected in parallel with the other terminal of the second capacitor Cs, a negative terminal of a primary side of the coupled inductor Lr and one terminal of a second active switch Q2. The other terminal of the second active switch Q2 is connected with a negative terminal of the first capacitor C1. The negative terminal of the first active switch Q1 is connected with a positive terminal of the primary side and a negative terminal of a secondary side of the coupled inductor Lr. A positive terminal of a fourth passive switch Q4 is connected with the negative terminal of the first capacitor C1 after a positive terminal of the secondary side of the coupled inductor Lr is connected with a negative terminal of a fourth passive switch D4. A positive terminal of a fifth passive switch D5 is connected with the negative terminal of the first capacitor C1 after a third capacitor Cr is connected in parallel with the fifth passive switch D5. A negative terminal of the fifth passive switch D5 is connected with the negative terminal of the first active switch Q1.

FIG. 2 to FIG. 6 are circuit diagrams of a resonance circuit for DC-link voltage control in a DC-to-AC inverter of this disclosure, wherein five operation stages are shown.

Figure 2:
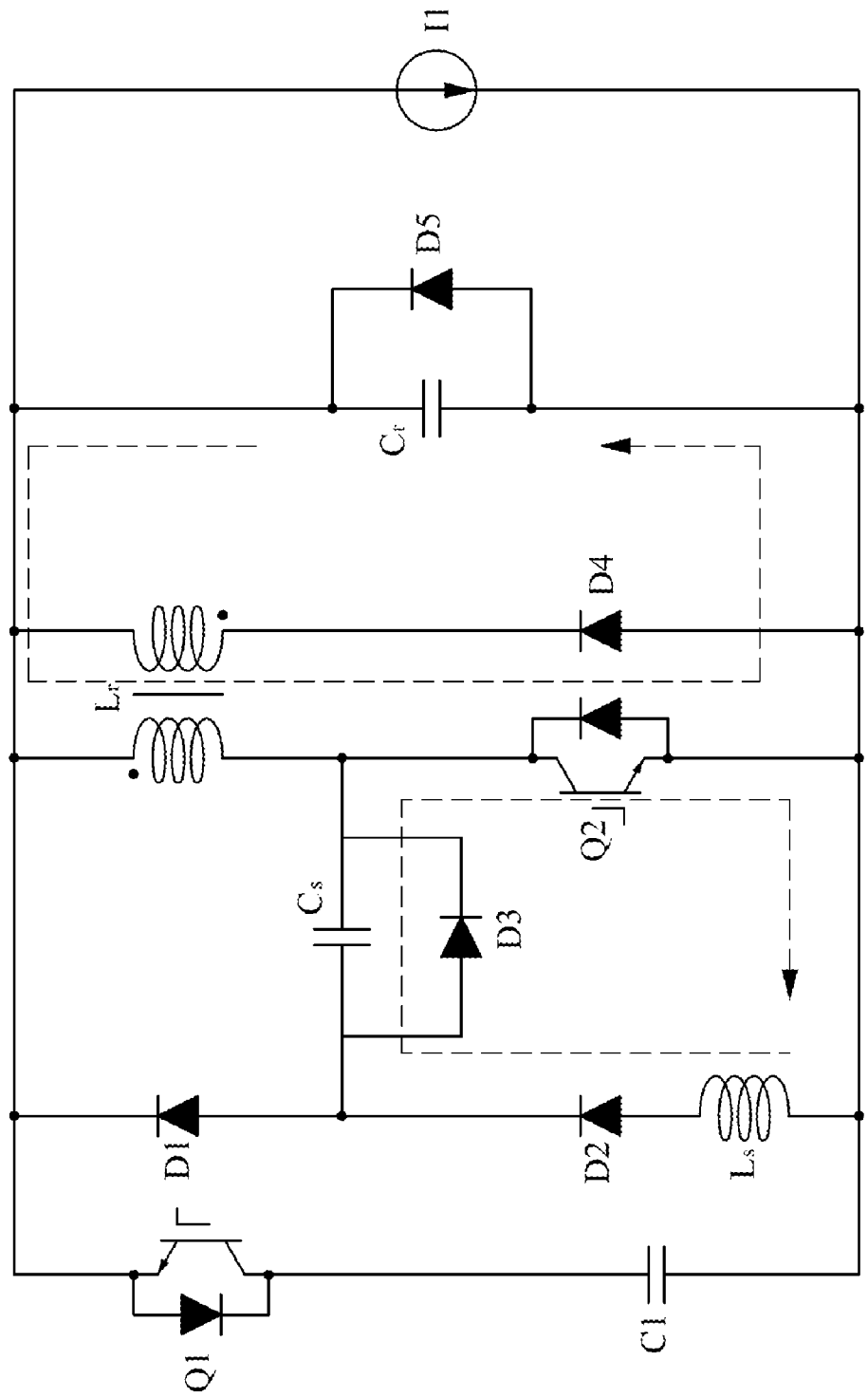
FIG. 2 is a circuit diagram of a resonance circuit for DC-link voltage control in a DC-to-AC inverter of this disclosure, wherein a first operation stage is shown.

First Stage:

Referring to FIG. 2, the second capacitor Cs is discharged to zero voltage by the second active switch Q2 when the first active switch Q1 is turned off and the second active switch Q2 is turned on so that a current from the inductor Ls flows through the second passive switch D2 to cause the inductor Ls to resonate with the second capacitor Cs. Moreover, the third capacitor Cr is discharged to zero voltage by the second active switch Q2 when the third capacitor Cr resonates with the coupled inductor Lr.

Figure 3:
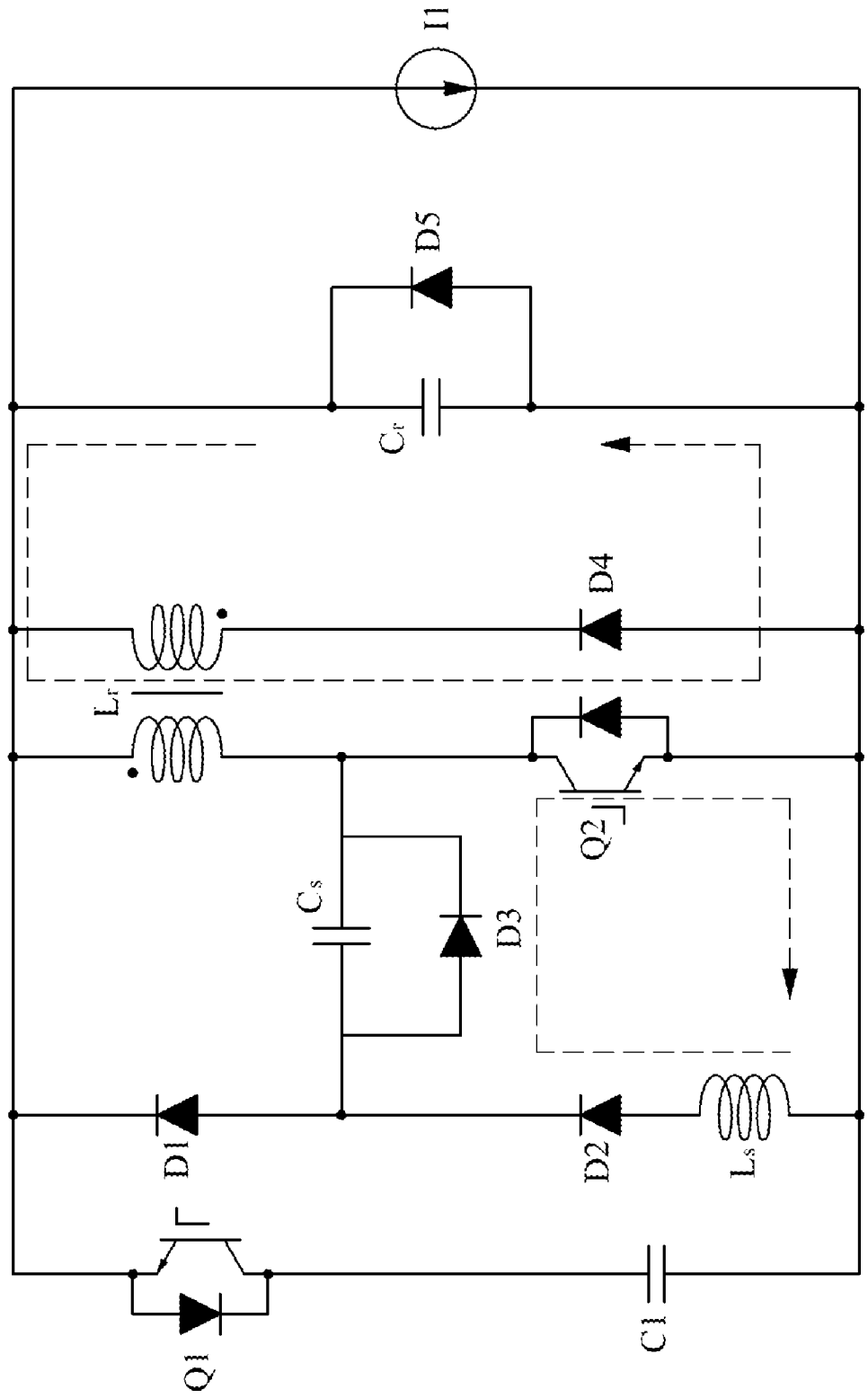
FIG. 3 is a circuit diagram of a resonance circuit for DC-link voltage control in a DC-to-AC inverter of this disclosure, wherein a second operation stage is shown.

Second Stage:

Referring to FIG. 3, the third capacitor Cr is continued being discharged by the second active switch Q2 after the second capacitor Cs is discharged to zero voltage by the second active switch Q2 so that the current from the inductor Ls flows through the third passive switch D3 and the second active switch Q2 to cause the third capacitor Cr to resonate with the coupled inductor Lr.

Figure 4:
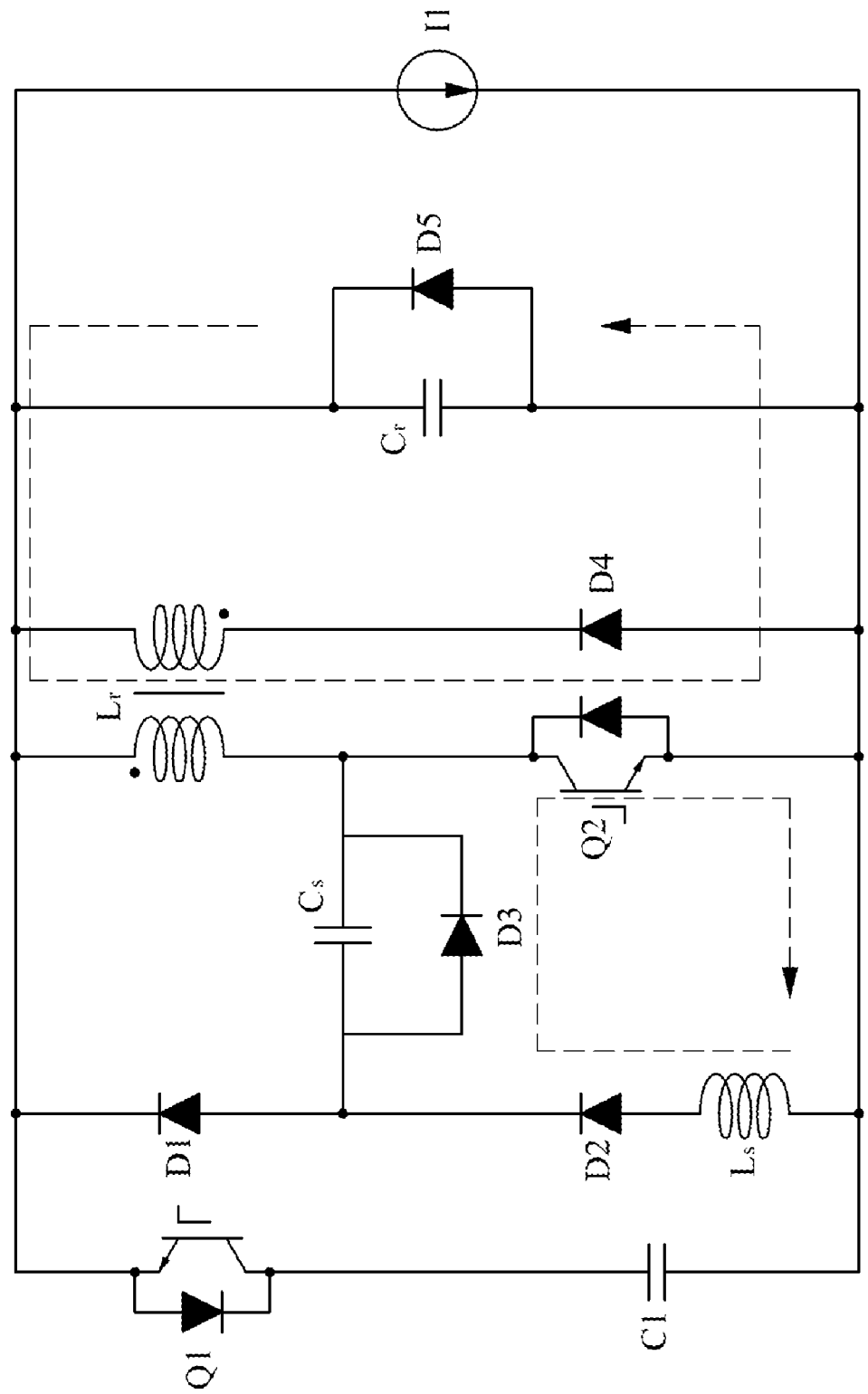
FIG. 4 is a circuit diagram of a resonance circuit for DC-link voltage control in a DC-to-AC inverter of this disclosure, wherein a third operation stage is shown.

Third Stage:

Referring to FIG. 4, the current from the coupled inductor Lr is conducted to flow through the fifth passive switch D5 and the second active switch Q2 after the third capacitor Cr is discharged to zero voltage by the second active switch Q2.

Figure 5:
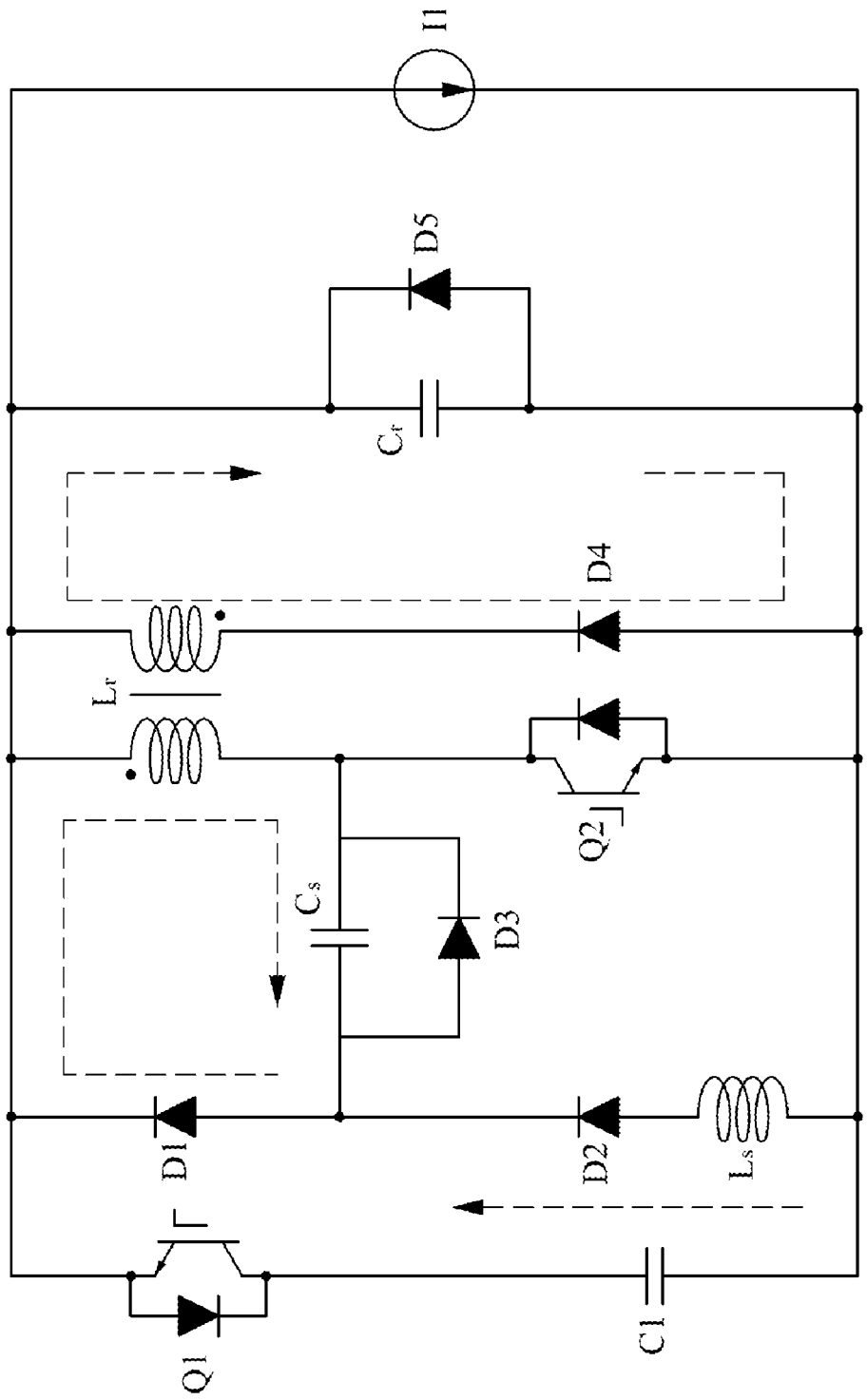
FIG. 5 is a circuit diagram of a resonance circuit for DC-link voltage control in a DC-to-AC inverter of this disclosure, wherein a fourth operation stage is shown.

Fourth Stage:

Referring to FIG. 5, the third capacitor Cr is charged by conducting the current from the coupled inductor Lr to flow through the fourth passive switch D4 and the winding on the secondary side, and the second capacitor Cs is charged by conducting a current from the primary side of the coupled inductor Lr when the second active switch Q2 is turned off.

Figure 6:
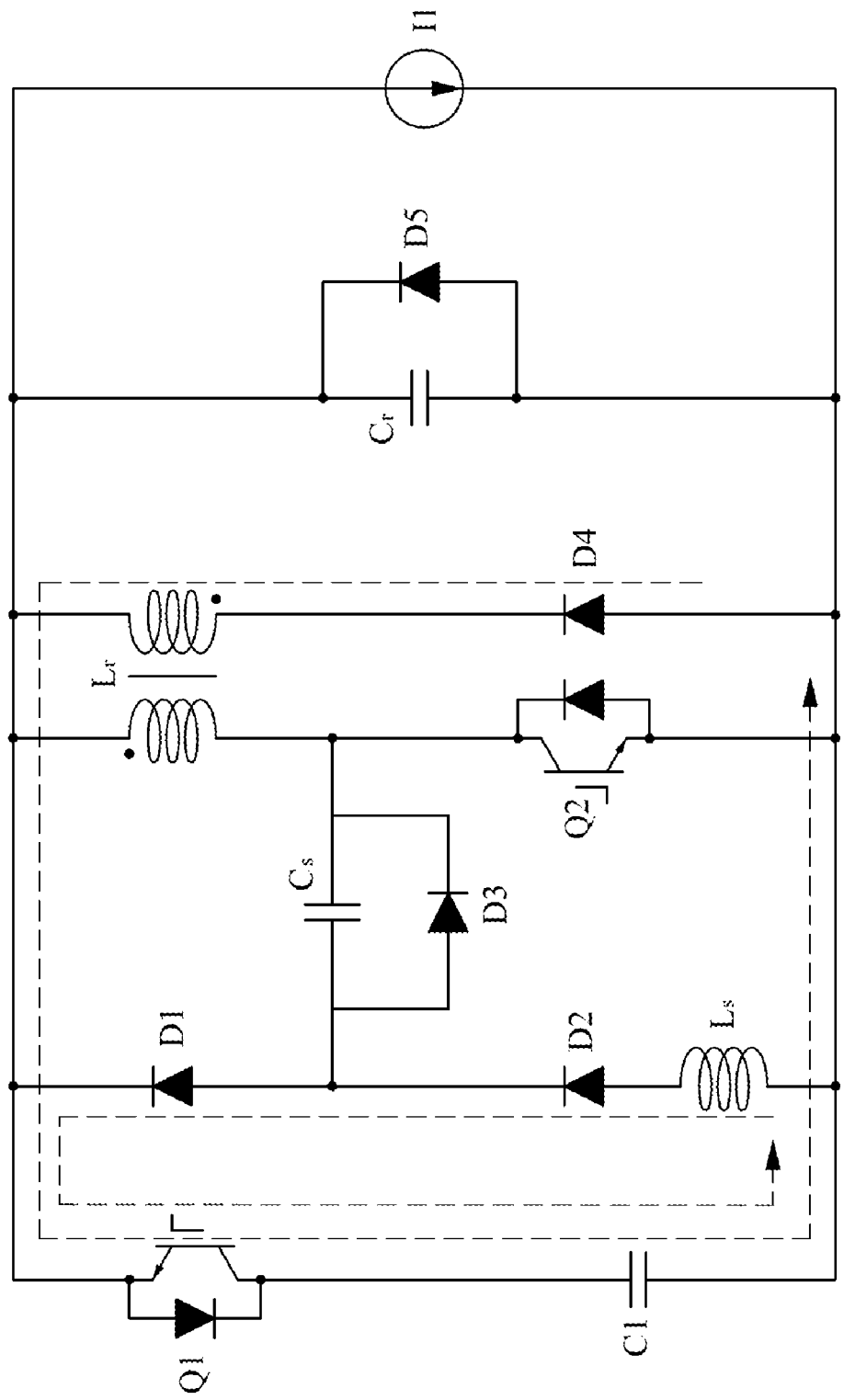
FIG. 6 is a circuit diagram of a resonance circuit for DC-link voltage control in a DC-to-AC inverter of this disclosure, wherein a fifth operation stage is shown.

Fifth Stage:

Referring to FIG. 6, charging the first capacitor C1 by turning on the first active switch Q1 to conduct the current from the inductor Ls and the current from the coupled inductor Lr when the second capacitor Cs and the third capacitor Cr are charged to predetermined voltage values.

From the descriptions with FIG. 1 to FIG. 6, it is readily understood that the present disclosure relates to a resonance circuit for DC-link voltage control in a DC-to-AC inverter, wherein the resonance circuit comprises two active switches. Before the active switches of the DC-to-AC inverter are turned on, a DC-link voltage is isolated by the active switches and the active switches of the DC-to-AC inverter are discharged by the resonance circuit to zero voltage at both ends. Then, the active switches of the DC-to-AC inverter are turned on again after the DC-link voltage is charged by the resonance circuit until the DC-link voltage restores to a normal voltage value. Hence, the active switches of the DC-to-AC inverter achieve zero-voltage switching. Not only the switching loss can be reduced to enhance the conversion efficiency, but also the electro-magnetic interference as well as the RF interference due to dynamic transient changes of the voltage (dv/dt) and of the current (di/dt) can be lowered.

In view of the above, this disclosure provides a resonance circuit for DC-link voltage control in a DC-to-AC inverter using soft switching to reduce surge voltage by returning a certain amount of energy to the electricity system to reduce switching loss and enhance conversion efficiency of the DC-to-AC inverter. The disclosure is therefore novel, non-obvious and useful.

Although this disclosure has been disclosed and illustrated with reference to particular embodiments, the principles involved are susceptible for use in numerous other embodiments that will be apparent to persons skilled in the art. This disclosure is, therefore, to be limited only as indicated by the scope of the appended claims.

What is claimed is:

1. A resonance circuit for DC-link voltage control in a DC-to-AC inverter, comprising:
    two active switches;
    a coupled inductor comprising two windings;
    an inductor;
    five passive switches; and
    three capacitors;
    wherein,
        a first active switch of the two active switches has a positive terminal connected in series with a positive terminal of a first capacitor of the three capacitors and a negative terminal connected in parallel with a negative terminal of a first passive switch of the five passive switches,
        a positive terminal of the first passive switch is connected with a negative terminal of a second passive switch of the five passive switches and one terminal of the second capacitor,
        a positive terminal of the second passive switch is connected with one terminal of the inductor, while the other terminal of the inductor is connected in parallel with a negative terminal of the first capacitor,
        a positive terminal of a third passive switch of the five passive switches is connected with the positive terminal of the first passive switch, the negative terminal of the second passive switch and one terminal of the second capacitor, while a negative terminal of the third passive switch is connected in parallel with the other terminal of the second capacitor, a negative terminal of a primary side of the coupled inductor and one terminal of a second active switch of the two active switches,
        the other terminal of the second active switch is connected with a negative terminal of the first capacitor, the negative terminal of the first active switch is connected with a positive terminal of the primary side and a negative terminal of a secondary side of the coupled inductor,
        a positive terminal of a fourth passive switch of the five passive switches is connected with the negative terminal of the first capacitor after a positive terminal of the secondary side of the coupled inductor is connected with a negative terminal of a fourth passive switch of the five passive switches,
        a positive terminal of a fifth passive switch of the passive switches is connected with the negative terminal of the first capacitor after a third capacitor of the three capacitors is connected in parallel with the fifth passive switch, and
        a negative terminal of the fifth passive switch is connected with the negative terminal of the first active switch.

2. The resonance circuit for DC-link voltage control in a DC-to-AC inverter as recited in claim 1, wherein the active switches are bipolar transistors.

3. The resonance circuit for DC-link voltage control in a DC-to-AC inverter as recited in claim 1, wherein the passive switches are diodes.

4. The resonance circuit for DC-link voltage control in a DC-to-AC inverter as recited in claim 1, further comprising a diode between a source electrode and a drain electrode of each of the two active switches.

5. A method for DC-link voltage control in a DC-to-AC inverter using the resonance circuit as recited in claim 1, comprising steps of:
    discharging the second capacitor to zero voltage by the second active switch when the first active switch is turned off and the second active switch is turned on so that a current from the inductor flows through the second passive switch to cause the inductor to resonate with the second capacitor;
    discharging the third capacitor to zero voltage by the second active switch when the third capacitor resonates with the coupled inductor;
    continuing discharging the third capacitor by the second active switch after the second capacitor is discharged to zero voltage by the second active switch so that the current from the inductor flows through the third passive switch and the second active switch to cause the third capacitor to resonate with the coupled inductor;
    conducting the current from the coupled inductor to flow through the fifth passive switch and the second active switch after the third capacitor is discharged to zero voltage by the second active switch;
    charging the third capacitor by conducting the current from the coupled inductor to flow through the fourth passive switch and the winding on the secondary side, and charging the second capacitor by conducting a current from the primary side of the coupled inductor when the second active switch is turned off; and
    charging the first capacitor by turning on the first active switch to conduct the current from the inductor and the current from the coupled inductor when the second capacitor and the third capacitor are charged to predetermined voltage values.

* * * * *